United States Patent [19]

Gibson et al.

[11] 4,290,305

[45] Sep. 22, 1981

[54] DRILLING FLUID CIRCULATING AND MONITORING SYSTEM AND METHOD

[75] Inventors: Joseph T. Gibson; Gerald L. Duhon, both of New Iberia, La.

[73] Assignee: A. C. Company, New Iberia, La.

[21] Appl. No.: 42,777

[22] Filed: May 29, 1979

[51] Int. Cl.³ ............................................. E21B 47/00
[52] U.S. Cl. ....................................................... 73/155
[58] Field of Search ..................... 73/155, 198; 175/48; 364/422, 804

[56] References Cited

U.S. PATENT DOCUMENTS

| | | | |
|---|---|---|---|
| 3,602,322 | 8/1971 | Gorsuch | 175/48 |
| 3,726,136 | 4/1973 | McKean et al. | 73/155 |
| 3,740,739 | 6/1973 | Griffin et al. | 175/48 X |
| 4,038,871 | 8/1977 | Edwards | 73/304 C |
| 4,043,193 | 8/1977 | Bailey | 73/155 |

Primary Examiner—Jerry W. Myracle
Attorney, Agent, or Firm—Guy E. Matthews

[57] ABSTRACT

A drilling fluid monitoring system and method includes a pump stroke counter providing an electrical signal representing the quantity of drilling fluid pumped into a well, a flow sensing device providing an electrical signal representing the flow of drilling fluid out of the well, fluid level an electrical measuring device providing an electrical signal representing the fluid level changes within a tank and a device receiving the electrical signals emitted by the pump stroke counter, flow sensor and measuring device to indicate changes in the circulation of the well drilling fluid.

16 Claims, 2 Drawing Figures

DRILLING FLUID CIRCULATING AND MONITORING SYSTEM AND METHOD

FIELD OF THE INVENTION

This invention relates generally to drilling fluid systems for well drilling apparatus and, more specifically, concerns a fluid monitoring system that is capable of immediately detecting any problem of lost or diminished circulation that might occur as a formation anomaly is intersected by the well bore being drilled.

BACKGROUND OF THE INVENTION

In the drilling of deep wells for the production of petroleum products, rotary drilling apparatus is typically employed. Drilling fluid, typically referred to as drilling mud, is utilized in conjunction with the well drilling apparatus to perform a number of functions. The drilling mud functions to provide a coolant and lubricant for the drill bit and to lubricate the drill stem as it rotates within the well bore. The drilling fluid also functions to flush drill cuttings that are loosened from the formation by the bit during drilling operations, thus preventing the drilling cuttings from interfering with further drilling operations. The drilling fluid also functions as a transporting medium to transport the drill cuttings to the surface where the same is separated from the drilling mud by means of mechanical separators, settling tanks or pits, etc. Another function of the drilling fluid medium is that it forms a filter cake lining for the well bore, which filter cake prevents loss of drilling fluid into certain types of earth formations. In the event certain portions of the filter cake fail to provide a proper seal at certain formations, quantities of the drilling fluid medium can flow into such formations and become lost. Obviously, drilling fluid is quite expensive and, therefore, it is desirable to insure against loss of drilling fluid from the well bore.

As the rotary drill is caused to bore through pressure bearing geological formations, it is important that the hydrostatic pressure of the drilling fluid within the well bore be sufficient to overcome the pressure within the formation, thus preventing the formation fluid from entering the well bore and causing a blowout. In many cases, the formations intersected by the well bore include structural anomalies such as cracks, fissures, voids, etc. Some earth formations are very soft or porous. In each of these cases, substantial loss of drilling fluid may occur when these types of formations are encountered by the drill bit. Since drilling fluid is pumped at high pressure through the drill stem to the bottom of the well bore being drilled, this high pressure fluid medium can flow directly into the formation, thus causing loss of circulation and depleting the drilling fluid to the extent that insufficient hydrostatic head is maintained to prevent blowouts from occurring. It is necessary when lost or diminished fluid circulation occurs that immediate steps be taken to replenish lost drilling fluid material and eliminate the cause of such lost or diminished circulation. In many cases when loss of drilling fluid is occurring, such loss does not become apparent for a number of hours. During this period a substantial quantity of drilling fluid may be lost and the cost of drilling the wells will thus be increased substantially. It is desirable to provide a suitable means for immediately identifying both sudden and gradual losses of drilling fluid to the formation being drilled in order that steps may be immediately taken to correct the cause of such loss.

During well drilling operations it is necessary to change the drilling bit under circumstances where it becomes dull or when the bit becomes ineffective due to changes in the formation being drilled. When the drill stem is removed from the well bore to change out the drilling bit, it is necessary that sufficient drilling fluid remain in the well bore to maintain a necessary hydrostatic head to prevent well blowout during this particular procedure. It is therefore important to have information immediately available that indicates the total volume of drilling fluid that is stored within the settling tanks or pits at the surface. Further, by knowing the amount of drilling fluid stored in the settling tanks or pits, operating personnel of the drilling rig will be immediately aware of the volume and thus hydrostatic head of the drilling fluid within the well bore at all times. If the hydrostatic head becomes insufficient, drilling fluid may be pumped from the settling tanks into the well bore as appropriate to the desired increase in hydrostatic head.

One of the more important aspects of the drilling fluid system is the efficiency of circulation developed by the drilling fluid pump. By knowing the amount of drilling fluid injected into and flowing out of the well during ordinary circulation, the personnel in charge of drilling are made aware of a number of characteristics of the drilling fluid circulation system. For example, pump efficiency is readily determined by inspecting changes in the volume of fluid circulation. Other information such as filling of the well bore with drilling mud during insertion or removal of the drill stem, the appearance of undesirable fluid, such as formation fluid, for example, in the drilling fluid can be identified rapidly through proper monitoring of all faces of the drilling fluid system. Well drilling personnel may also need or desire to know the required time lapse between injection of drilling fluid into the well and outflow of contaminated drilling fluid from the well. Unusual changes in the time lapse between injection and outflow can be indicative of events within the well bore that might require certain corrective activities on the part of drilling fluid personnel.

THE PRIOR ART

It has been common practice for well drilling personnel to attempt monitoring of drilling fluid systems without the aid of technical information relating to flow rates, stored volumes, etc. Thus far, the only known drilling fluid monitoring devices comprise devices are utilized solely for measuring the volume of drilling fluid stored at the surface in settling tanks, settling pits or the like. Some of these devices have heretofore taken the form of simple switch devices that are controlled by floats provided at the ends of switch arms and floating at the surface of the settling and suction tanks. When the level of drilling fluid within the settling and suction tanks becomes insufficient, the float actuated switches simply alert the well drilling personnel that the stored volume of fluid is low, thus allowing time for additional drilling fluid to be prepared and placed within the discharge tank of the drilling fluid system. Other similar devices suggested for monitoring the amount of drilling fluids stored in settling tanks or pits includes the use of compressed air communicated to regulating devices that are attached to floats that sense the level of the drilling fluid in the tanks or pits. Pneumatic signals are transmitted to a special relay or pressure control device and these signals are averaged and transmitted to an indicator and recorded with the volume being totalized and recorded on a suitable chart that may be inspected by the drilling personnel. Further, suitable alarm devices may be connected to the signal devices to provide a warning signal to the operator in the event there is an unusual gain or loss in the predetermined quantity of fluid of the drilling fluid system. Obviously, the drilling personnel utilizing such equipment must render a judgment based on experience when drilling fluid losses, gains or change in characteristics indicate the occurence of a phenomenon within the well bore that may suggest the happening of an undesirable event.

Another device for monitoring the volume of drilling fluids within the settling tanks or pits includes a float transducer that floats on the fluid and becomes raised and lowered as the level within the settling tanks increases or decreases. A sensor is provided within a shaft about which the float is disposed and follows movement of the float by means of a magnetic coupling connection. Vertical movement of the float causes rotation of an electrical device within the shaft thus causing the development of a particular electrical voltage signal that is transmitted to a totalizer circuit to provide a recorded indication of the total volume of drilling fluid in the settling tanks or pits. The recording device may be inspected for a determination of any significant changes in the volume of the drilling fluid medium as compared to a preselected desirable volume.

It has also been desirable to provide an accurate measurement of the quantity of drilling fluid being injected into the well bore during drilling operation. Pump stroke counters have been utilized which provide electrical pump stroke signals that may be transmitted to totalizer circuitry to provide drilling personnel with a visual indication of the volume of fluid being pumped and the total volume of fluid pumped for any particular period of time. Since drilling fluid pumps are normally reciprocating type pumps, each stroke is representative of a quantity of drilling fluid being injected into the well bore. Thus, a stroke counter is an accurate means of measuring the volume of fluid needed to fill the well bore or each pipe section with fluid and enables the drilling personnel to accurately measure the amount of drilling fluid introduced into the well bore for any given period of time.

Other devices have also been developed to sense and measure the flow of fluid returning from the well. A flow sensor for measuring the flow of drilling fluid typically incorporates a rotor device that is rotated by the flowing drilling fluid. A torque indicating system is interconnected with the rotor device and is adapted to transmit an electrical or pneumatic signal responsive to the torque that is developed by the speed of the rotor. An instrument positioned at the rig floor is utilized to indicate the flow of fluid, record such flow and render an audible alarm in the event the rate of flow should fail to exceed a predetermined minimum. Rotor driven flowmeters of this nature are seldom satisfactory because of the erosive and corrosive characteristics of the drilling fluid flowing through the return line. Drilling fluid is a slurry with water or a fluid chemical as the basic liquid medium and with various particulate matter incorporated into the fluid medium to provide the various functions desired by various conditions of the well being drilled. Typically, drilling fluid contains a substantial quantity of finely divided weighting material, i.e. iron oxide, typically referred to as barite. For the purpose of increasing the viscosity of the drilling mud and enabling it to entrain drill cuttings and transport the drill cuttings to the surface, drilling mud typically contains a substantial quantity of earthy clay, which is also referred to as bentonite. The iron oxide and earthy clay particulate forming the weighting and viscosity components of the drilling fluid are very abrasive and cause rapid deterioration of rotary flowmeters utilized to measure the flow of drilling fluid. Other drilling fluid mediums, such as salts laden with viscosity agents, do not contain substantial quantities of erosive materials. Typically, the only abrasive agents contained in salt based drilling fluids is the particulate that is eroded from the formation by the drill bit. Salt type drilling fluids, however, are quite corrosive to rotary flowmeters and generally interfere with proper operation thereof. It is, therefore, desirable to provide means for measuring the flow of drill fluid returning from the well bore, which means is accurate in measurement and is not interfered with by the erosive or corrosive characteristics of the drilling fluid involved.

It is therefore an important feature of the present invention to provide a novel drilling fluid monitoring system having the capability of accurately measuring flowing drilling fluid and which system, including the various components thereof, is not interfered with by the erosive or corrosive characteristics of the drilling fluid being utilized.

It is also a feature of the present invention to provide a novel drilling fluid monitoring system wherein the volume of drilling fluid stored at the surface and ready for injection into the well is accurately measured, totalized and transmitted to detection and recording apparatus that may be inspected by drilling personnel.

Among the several features of the present invention is contemplated the provision of a novel drilling fluid monitoring system whereby drilling fluid injected into the well being drilled and returning from the well bore are detected and electrical signals representing volumetric flow rates are provided at detection and recording apparatus for inspection by the drilling personnel.

An even further feature of this invention concerns the provision of a novel drilling fluid monitoring system whereby electrical signals representing the volume of stored drilling fluid and the flow rates of injected and returning drilling fluid are correlated electronically with correlated detected and recorded signals being available for inspection by drilling personnel.

It is also a feature of the present invention to provide an audible or visual alerting signal in the event the various flow rates or volumes of drilling fluid detected by the monitoring system fail to correspond to acceptable limits established by the drilling personnel.

Another important feature of this invention concerns the provision of a novel drilling fluid monitoring system having the capability for detecting and recording both sudden and gradual changes in the drilling fluid characteristics monitored thereby providing drilling personnel with information on which decisions may be based for the cure of problems indicated by inspection of the signal display apparatus of the monitoring system.

Other and further objects, advantages and features of this invention will become aparent to one skilled in the art upon consideration of the teachings hereof. The form of the invention, which will now be described in detail, illustrates the general principles of the invention, but it is to be understood that this detailed description is not to be taken as limiting the scope of the invention.

SUMMARY OF THE INVENTION

In accordance with the present invention, a drilling fluid monitoring system comprises apparatus for detecting, measuring and recording various aspects of drilling fluid handling including injection into the well, return from the well and storage in settling tanks at the surface. The volume of fluid injected into the well is detected by means of pump stroke counting means that is integrated with the drilling fluid pump and provides signals representative of each stroke of the pump. These signals are transmitted to detection apparatus that totalize the signals and provide a visual representation indicating the volume of injected drilling fluid. In order to accomplish measurement of the flow of contaminated drilling fluid returning from the well bore, electrical flow sensing apparatus is mounted within a drilling fluid return line through which the drilling fluid is transported from the well head apparatus to the first of the settling tanks or pits. The electrical return flow sensing device provides an electrical signal representative of the volume of drilling fluid flowing out of the well and signals from the flow sensor are transmitted to detection and recording apparatus that may be monitored by drilling personnel.

Measurement of the volume of drilling fluid stored at the surface is accomplished by providing electrical level measuring devices for each of the storage tanks or vessels that are utilized for storage and settling of the drilling fluid. Electrical signals representing the level and thus volume of drilling fluid stored in each of the settling tanks are electrically processed, amplified and transmitted to detection and recording apparatus providing a cumulative display representing the stored volume of drilling fluid. These electrical signals are correllated with the electrical signals representing injected and returning flow of drilling fluid for the purpose of providing an indication of the status of all phases of the drilling fluid system.

The various flow and level or volume sensing apparatus in each case takes the form of variable capacitance type liquid level measuring devices. In the case of level and volume measuring of the settling tanks, capacitance signals are provided indicating the level of liquid stored in each of the tanks. By knowing the volume of these tanks the cumulative volume of all of the tanks is easily computed by electrical processing means. Measurement of the volume of returning drilling fluid is also accomplished by a variable capacitance type liquid level detector that is positioned in the return line and measures the level of fluid present in the return line. The level of returning fluid in the return line reflects the volume of returning flow and thus, the capacitance signal provided represents the volume of returning flow. This signal is electrically processed and displayed by an electric meter for instant detection of changes in returning flow and graphically in order that such changes are recorded for use by the drilling personnel. the electrical processing apparatus correlates electrical signals representing the volume of drilling fluid injected into the well and returning from the well and presents such signals by means of electrical meters and graphical representation for inspection and use by drilling personnel. In the event the correlation of such signals falls outside of an acceptable range, the signal processing circuitry will provide an audible and/or visible alert signal for the purpose of alerting the drilling personnel that corrective measures are immediately in order to restore the drilling fluid circulation system to proper operation.

Further, in accordance with the present invention, a method of monitoring changes in the drilling fluid circulation of a drilling fluid circulation system comprises the steps of (1) counting the number of strokes of a drilling fluid circulation pump and accumulating electrical signals representing such strokes for determining the volume of drilling fluid being injected into the well. The method also includes (2) measuring the level of drilling fluid in a drilling fluid return line leading to the first storage tank or pit and providing an electrical signal representing the measured level and thus measured volumetric flow rate of returning drilling fluid being forced out of the well by the injected drilling fluid. The monitoring method also includes (3) detecting the level of drilling fluid stored in surface tanks and providing an electrical signal that is representative of the cumulative level and thus cumulative volume of drilling fluid stored in the various surface settling tanks. The method further includes (4) electrical processing of the stored volume signals and transmission of a cumulative stored volume signal to detection and recording apparatus for electrical and graphical display. These electrical signals are than (5) compared by the signal processing circuitry and, in the event the comparison falls outside of an acceptable range, alerting signals are provided to insure that corrections are made to restore the circulation system to proper operation. The method may also include (6) comparison of electrical signals representing drilling fluid injected into the well and flowing from the well in order to determine if drilling fluid is being lost to the formation. The electrical signal processing circuitry also (7) provides an alarm signal in the event the volumetric flow measurements of injected and returning drilling fluid fails to fall within an acceptable range determined by the circuitry.

BRIEF DESCRIPTION OF THE DRAWINGS

For an understanding of the principles of this invention, reference is made to the following description of a typical embodiment thereof as illustrated in the accompanying drawings, in which.

While the invention will be described in connection with preferred embodiments and procedures, it will be understood that it is not intended to limit the invention to those specific embodiments and procedures disclosed herein. It is intended that the present invention encompass all alternatives, modifications and equivalents as may be included within the spirit and scope of this invention.

DETAILED DESCRIPTION OF PREFERRED EMBODIMENT

Figure 1:
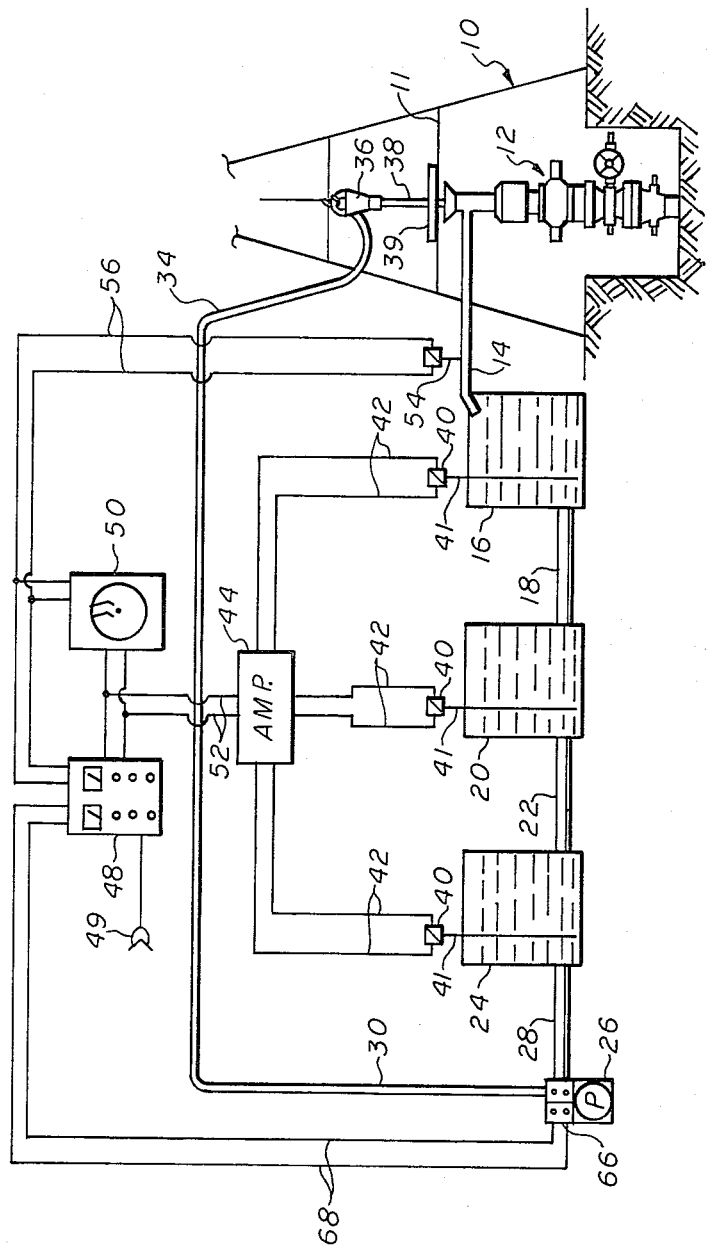
FIG. 1 is a schematic representation of a drilling circulation system provided with drilling fluid monitoring apparatus constructed in accordance with the present invention.

Referring now to the drawings and first to FIG. 1, a conventional drilling rig is diagrammatically illustrated generally at 10 and includes a drilling platform 11 positioned above a conventional wellhead illustrated generally at 12. Extending from the wellhead 12 is a drilling fluid return line 14 receiving contaminated drilling fluid being forced from the well bore by injected drilling fluid. The return line 14 transports the contaminated drilling fluid to a first drilling fluid settling tank 16. A pipe 18 is shown to extend from the lower portion of settling tanks 16 and to provide fluid communication with a second settling tank 20. Another drilling fluid transfer pipe 22 extends from the lower portion of settling tank 20 and is communicated with the lower portion of a third settling tank 24. Typically, tanks 16 and 20 are settling tanks while the third tank 24 comprises a suction tank from which a drilling fluid injection pump 26 draws drilling fluid from tank 24 via a suction pipe 28. Drilling fluid circulation is accomplished by fluid pressure achieved as pump 26 forces the drilling fluid through a fluid supply conduit 30 to a flexible swivel hose 32 that communicates pipe 30 with a swivel device 36. An elongated drive stem or kelly 38 is connected to the lower portion of the swivel 36 and extends through a rotary table 39 that may be driven in any suitable manner. The kelly, which is an elongated noncircular tubular element, extends through a mating noncircular opening in the rotary table 39 and thereby rotation of the rotary table accomplishes rotation of the kelly. The drill stem extending downwardly through the well bore is connected to the lower extremity of the kelly and is rotated along with the kelly to cause rotation of a drill bit attached to the lower extremity of the drill stem.

As the drilling bit is rotated against the formation, drill cuttings are eroded from the formation and must be immediately transported away from the immediate vicinity of the drill bit. Further, rotation of the drill bit against the formation develops heat which, if not continuously removed, will result in rather rapid wearing or deterioration of the drill bit. Removal of drill cuttings and cooling of the bit as well as lubrication of the bit and the drill stem rotating in the well bore is accomplished by drilling fluid, typically referred to as drilling mud which is forced by pump 26 through conduit 30, flexible hose 34 and swivel 36 into the tubular passage defined by the kelly and the drill stem. Drilling fluid emerges through openings at the drill bit and causes drill cuttings to be continuously flushed away from the drill bit. The drilling fluid also removes heat from the formation being drilled, thus providing a coolant function for the drill bit. The drilling fluid is sufficiently viscous to entrain drill cuttings therein and transport the drilling cuttings upwardly through the annulus defined between the drill stem and the well bore to the wellhead at the surface. This upwardly flowing contaminated drilling fluid flows outwardly from the wellhead by means of the return conduit 14 to the first settling tank 16. Circulation of drilling fluid is typically referred to as the fluid activity that occurs between injection of the drilling fluid into the drill stem and return of the drilling fluid from the well bore into the first settling tank. Of course, the entire circulation system for the drilling fluid includes the volume of drilling fluid within settling tanks 16 and 20 and suction tank 24.

It is desirable that drilling personnel be aware at all times of the volume of drilling fluid stored at the surface and ready for injection into the well. In the event a substantial quantity of drilling fluid is required for any particular reason, the tanks 16, 20 and 24 must provide sufficient drilling fluid as required for drilling operations. Further, the volume of drilling fluid the settling tanks and suction tank should be inspected from time to time in order to insure that circulation of the drilling fluid is being accomplished normally. In the event the level of drilling fluid within the settling and suction tanks should decrease more rapidly than is expected, such would be an indication that the formation being drilled is taking on a substantial quantity of the drilling fluid. For example, the drill bit may intersect a fissure or other passage extending through the formation and the drilling fluid may be flowing into this subsurface anomaly. In order to correct this undesirable loss of drilling fluid to the formation, various lost circulation materials, such as plastic strips, walnut hulls, plastic beads, etc., may be entrained in the drilling fluid injected into the well. These lost circulation materials will bridge the subsurface anomaly thereby providing a seal and preventing further loss of drilling fluid.

Figure 2:
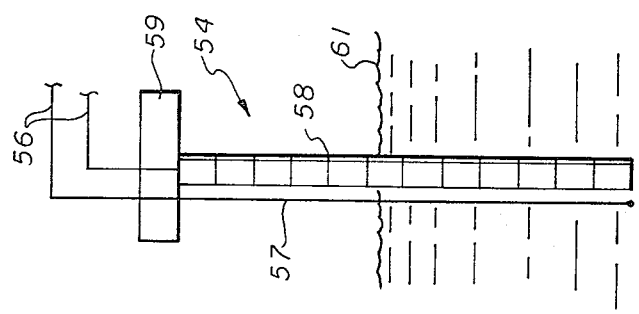
FIG. 2 is an enlarged schematic representation of a variable capacitance type electrical fluid level measuring device such as is utilized in conjunction with the present invention.

In order to monitor the level and thus volume of drilling fluid contained within the settling and suctions tanks, a plurality of fluid level measuring devices 40 are positioned at the upper portion of each one of the settling and suction tanks. Liquid level measuring probes 41 extend downwardly to the lower portion of each one of the tanks in order to detect the level of liquid standing therein. Each of the probes 41 is constructed in the manner illustrated in FIG. 2 and discussed hereinbelow. Electrical sensor devices 40 render electrical signals representing the level of fluid contained within respective ones of the tanks 16, 20 and 24 and these electical signals are transmitted via conductors 42 to an amplifier circuit 44. The electrical signals received by the amplifier circuit are electronically processed and totalized with the output of the amplifier circuit representing a cumulative measurement of the volume of drilling fluid contained within the settling and suction tanks. The output signal of amplifier circuit 44 is conducted by means of conductors 52 to an indicator circuit 48 and a recorder circuit 50. Indicator circuit 48 may include one or more electric meters that reflect the measured volume contained within the tanks. Simultaneously, recorder 50 provides a continuing graphical representation of the volume of fluid contained within the tanks. In the event the cumulative tank volume should be decreasing gradually, this fact may be difficult to ascertain by means of the visual meter readout of indicator circuits 48. The graphical representation presented by recorder 50, however, will clearly indicate gradual losses of drilling fluid due to subsurface anomalies.

Rapid losses of drilling fluid to the down hole formation will be clearly evidenced by inspection of the meter positions of indicator circuitry 48. Moreover, in the event the fluid level and thus volume of drilling fluid in the tanks should be decreasing at a rapid rate, indicator circuitry 48 may include a visual or audible signal device 49 that may be energized by the detector circuitry so as to provide an alarm signal advising drilling personnel that immediate action must be taken to cure drilling fluid loss and maintain the safety of the drilling fluid system. The alarm signal device 49 may also be activated by circuitry 48 in the event the sensed level within the tanks falls below a predetermined minimum limit, thus advising the drilling personnel that additional drilling fluid should be introduced into the circulation system to replenish the depleted drilling fluid. Recording device 50 maintains a continuous record of the volume of drilling fluid stored within the tanks 16, 20 and 24 and also provides a continuous record of the volume of drilling fluid flow that is detected both at pump 26 and at a liquid flow detector 54 connected into the drilling fluid return line 14. Preferably, recorder 50 will be of the double pen type for providing a continuous graphical presentation with one of the pens indicating the flow of fluid through return line 14 while the other one of the pens indicates the quantity of fluid stored within the settling and suction tanks.

Preferably, liquid level sensing devices 40 and flow sensing device 54 each function to measure the level of drilling fluid within the settling and discharge tanks and within the return line 14. Preferably, flow sensing devices 40 and 54 are variable capacitor type liquid level measuring devices as depicted diagrammatically in FIG. 2. The capacitance type liquid level sensor illustrated generally at 54 incorporates a pair of capacitor plates or electrodes 57 and 58 that extend from a signal sensor 59 to the lower portion of the vessel or conduit being measured. Plates 57 and 58 generally comprise the probe illustrated at 41 in FIG. 1. Plates 57 and 58, which may conveniently take the form illustrated in U.S. Pat. Nos. 3,744,314; 3,533,286 or 4,003,259 are separate electrode elements that are bridged by the liquid in which the plates are partially immersed and the capacitance defined by plates 57 and 58 varies directly with the level of liquid within which the plates are immersed. The capacitance signal detected by sensor 59 is transmitted via conductors 56 to signal processing circuitry of any suitable character that provides electrical signals for display by indicator circuitry 48 and recorder 50. As the level of liquid changes within the tanks or within the return line 14, the capacitance defined by capacitor plates 57 and 58 changes accordingly thereby modifying the signal detected by sensor 59. In the case of the storage tanks 16, 20 and 24, the capacitance signals reflect the depth of liquid contained within the tanks and, by knowing the volume of liquid at any particular liquid level, the volume of each of the tanks is rendered in terms of the electrical capacitance signal. In the case of the volume of flow through return line 14, it should be borne in mind that the returning drilling fluid is under little or no pressure, thus, the level of liquid within return line 14 as the liquid flows toward the first tank 16 will provide an indication of the volume of fluid flow that is occurring at any given time. By measuring the depth of liquid within return line 14, a capacitance signal will be registered, reflecting the volume of return fluid flow and this volume is transmitted in the form of the capacitance signal to indicator and recorder circuit 48 and 50. The volume of the static fluid retained within the settling and suction tanks is thus reflected by capacitance signals and the volume of flowing fluid within the return line 14 is also reflected by means of capacitance signals.

It is also desirable to provide information concerning the volume of drilling fluid injected into the well by means of pump 26. Since pump 26 is a typical reciprocating type mud pump, the volume of the pump is indicated by accumulation of pump stroke signals. A conventional pump stroke counting device 62 is interconnected with pump 26 and provides electrical signals representing each stroke of the pump. The electrical signals of the pump are conducted to indicator circuit 48 by means of conductors 68, thereby providing electrical meter representation at the indicator circuitry of the volume of injected drilling fluid developed by pump 26. Since the volume of injected drilling fluid is known by way of the pump stroke counting device 66 and the volume of returning drilling fluid is known by way of the capacitance type liquid level measuring device 54, the injected and returning drilling fluid may be subjected to signal comparison. If signal comparison falls within an acceptable range, then circulation of the drilling fluid is functioning normally. In the event comparison of electrical signals representing injection and return of drilling fluid is beyond acceptable limits, an immediate indication is given that drilling fluid is being lost to the formation being drilled or fluid is entering the drill fluid column from the formation. In either case, corrective measures must be undertaken immediately in order to insure the safety of the well being drilled. Correlation of the electrical signals representing stored fluid at the surface, injected drilling fluid and returning drilling fluid may be continuously displayed by way of the recorder 50 and may be displayed for immediate reference by way of electrical meters at detector circuitry 48. These electrical signals may be correlated in such manner that abnormal conditions of drilling fluid circulation will become immediately known by the drilling fluid personnel and steps may be taken in order to cure the problem as soon as possible. Drilling of high pressure petroleum producing wells will thus be rendered controllable and safe through utilization of the drilling fluid monitoring system of this invention.

From the foregoing it will be seen that this invention is one well adapted to attain all of the objects and features hereinabove set forth, together with other advantages which are obvious and inherent to the apparatus disclosed herein. It will be understood that certain combinations and subcombinations are of utility and may be employed with reference to other features and subcombinations within the spirit and scope of the present invention.

As many possible embodiments may be made to this invention with departing from the spirit and scope thereof. It is to be understood that all matters hereinabove set forth or shown in the accompanying drawings are to be interpreted as illustrative and not in any limiting sense. The invention, having been described,

What is claimed is:

1. A drilling fluid monitoring system, comprising:
   pump stroke counting means interconnected with a drilling fluid circulation pump and providing electrical signals representing the volume of drilling fluid being pumped into a well;
   means for sensing the level of fluid in a drilling fluid return line to provide electrical signals representing the volume of drilling fluid returning from the well
   said level sensing means including a capacitive measuring probe extending down from the top of said flow line, said capacitive measuring probe having spaced apart electrode plates with the capacitance of said electrode plates changing as the level of fluid rises and lowers within said flow line;
   electrical measuring means mouted with drilling fluid storage tank means and providing electrical signals representing the level of drilling fluid within said tank means; and
   signal diaplay means receiving and correlating the electrical signals emitted by said pump stroke counting means said level sensing means and said electrical measuring means, said signal display means indicating the volume of stored drilling fluid, the volume of injected fluid and the volume of returning drilling fluid, said signal display means further indicating changes in the volumes of stored, injected and returning drilling fluid.

2. The system of claim 1, wherein:

said electrical measuring means includes a capacitive measuring probe means extending down from the top of said tank means for measuring the level and thus volume of drilling fluid within said tank means, said capacitive measuring probe means having spaced electrode plates with the capacitance of said electrode plates changing as the level of the fluid rises and lowers within the tank.

3. The system of claim 1, wherein:
said indicating means includes a two pen graphical recorder for providing a permanent graphical display of volumes represented by said electrical signals, one of said pens indicating the volume of drilling fluid flowing through the return line and the other pen indicating the level and volume of drilling fluid stored in said tank means.

4. The system of claim 1, including:
an electrical level and thus volume measuring means associated with each one of a series of drilling fluid storage tanks which are in fluid communication with one another, said signal display means accumulating the electrical signals of said measuring means and providing a cumulative electrical signal representing the volume of drilling fluid stored in said tanks.

5. The system of claim 4, including:
means mounted with each electrical measuring means for receiving the electrical output signals therefrom and for amplifying the output signals prior to transmission of said output signals to said indicating means.

6. The system of claim 5, wherein:
each of said electrical measuring means includes a capacitative measuring probe extending down from the top of each tank for measuring the level of fluid within each tank, each capacitative measuring probe having spaced electrodes with the capacitance between said plates changing as the level of the fluid rises and lowers within the tanks.

7. The system of claim 6, wherein:
said indicating means includes a two pen graphical recorder for providing a continuous graphical presentation of electrical signals representing said volumes, one of said pens indicating the volume of drilling fluid flowing through the return line and the other pen indicating the total quantity of fluid stored in the tanks.

8. The system of claim 1, wherein:
said indicator means continuously compares electrical signals representing injected drilling fluid and returning drilling fluid and renders an alarm signal in the event such signal comparison is outside of an acceptable predetermined range.

9. A method of monitoring changes in the fluid circulation of a drilling fluid circulation system, comprising:
counting the number of strokes of a drilling fluid circulation pump for determining the volume of the drilling fluid being pumped into a well;
supporting a capacitance probe within a drilling return line to measure the liquid level of drilling fluid in said drilling fluid return line leading to storage tank means to provide an electrical signal representing the volume of drilling fluid flowing out of the well;
measuring the level of drilling fluid in storage tank means with electrical fluid level measuring means and providing an electrical signal representing the volume of drilling fluid stored in said tank means; and
recording the electrical signals from the electrical fluid level measuring means mounted with the fluid return line and tank for comparing the quantity of drilling fluid returning to and contained within said tank means with the quantity of drilling fluid flowing into the well.

10. The method of claim 9, including:
recording the electrical signal from an electrical measuring means mounted with each of a series of drilling fluid storage tanks which are in fluid communication with one another.

11. The method of claim 9, including:
supporting a capacitive probe within the storage tank means and providing the electrical capacitance signals representing the liquid levels in said tank means and return line, said capacitance signals being displayed and recorded.

12. A drilling fluid circulating system, comprising:
tank means for storing a volume of drilling fluid used in a well;
pump means mounted in fluid communication with said tank means for pumping drilling fluid from said tank means into the well;
a drilling fluid return line mounted in fluid communication with the well for transporting drilling fluid discharged from the well to said tank means; and
means mounted with said tank means and said drilling fluid return line for monitoring variations in the volume of drilling fluid in said tank means and in the volume of drilling fluid flowing through said return line, said monitoring means including:
electrical measuring means for providing an electrical signal representing the level of drilling fluid in said tank means and for providing an electrical signal representing the level of drilling fluid in said return line;
said electrical measuring means includes a capacitive measuring probes extending downwardly into said return line and said tank means, said capacitive measuring probe having spaced electrodes with the capacitance of said electrodes changing as the levels of the fluid rises and lowers within the tank means and return line;
and means responsive to the electrical signals provided by said electrical measuring means for indicating changes in said fluid levels of said tank means and said return line.

13. The system of claim 12, wherein:
said indicating means includes a two pen graphical recorder for providing a continuous representation of said capacitance signals and hence said volumes of said tank means and return line, one pen indicating the volume of fluid flowing through the return line and the other pen indicating the volume of fluid stored in the tank means.

14. The system of claim 12, including:
electrical measuring means mounted with each one of a series of drilling fluid storage tanks which are in fluid communication with one another, each said electrical measuring means providing an electrical signal received by said indicating means, the sum of the electrical signals representing the cumulative volume of drilling fluid stored in the tanks.

15. The system of claim 14, including:
means mounted with each electrical measuring means for receiving the electrical signals therefrom and for amplifying the received signals.

16. The system of claim 15, wherein:
said indicating means including a two pen graphical recorder for providing a continuous readout, one pen indicating the volume of fluid flowing through the return line and the other pen indicating the total volume of fluid stored in the tanks.

* * * * *